(12) United States Patent
Okada

(10) Patent No.: US 7,503,704 B2
(45) Date of Patent: Mar. 17, 2009

(54) OPTICAL RECEPTACLE

(75) Inventor: Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/736,171

(22) Filed: Apr. 17, 2007

(65) Prior Publication Data
US 2007/0274643 A1     Nov. 29, 2007

(30) Foreign Application Priority Data
Apr. 18, 2006   (JP) .............................. 2006-113927

(51) Int. Cl.
*G02B 6/36* (2006.01)
(52) U.S. Cl. ...................................... 385/88
(58) Field of Classification Search .................... 385/88
See application file for complete search history.

(56) References Cited

U.S. PATENT DOCUMENTS

| 5,222,169 | A | * | 6/1993 | Chang et al. | 385/87 |
| 5,307,435 | A | * | 4/1994 | Chihara | 385/92 |
| 5,537,503 | A | * | 7/1996 | Tojo et al. | 385/93 |
| 5,546,490 | A | * | 8/1996 | Kikuchi et al. | 385/93 |
| 5,737,465 | A | * | 4/1998 | Okochi | 385/88 |
| 6,179,483 | B1 | * | 1/2001 | Kanazawa | 385/93 |
| 6,283,644 | B1 | * | 9/2001 | Gilliland et al. | 385/93 |
| 6,880,983 | B2 | * | 4/2005 | Stewart et al. | 385/92 |
| 6,916,119 | B2 | * | 7/2005 | Okochi et al. | 385/78 |
| 2003/0002817 | A1 | * | 1/2003 | Yamaguchi et al. | 385/78 |
| 2005/0220424 | A1 | * | 10/2005 | Asano et al. | 385/78 |
| 2006/0078261 | A1 | * | 4/2006 | Endou et al. | 385/92 |
| 2006/0133740 | A1 | * | 6/2006 | Nakanishi et al. | 385/88 |
| 2006/0274998 | A1 | * | 12/2006 | Ito et al. | 385/92 |

FOREIGN PATENT DOCUMENTS

JP        2005-070499        3/2005

* cited by examiner

*Primary Examiner*—Ellen Kim
(74) *Attorney, Agent, or Firm*—Fish & Richardson P.C.

(57) ABSTRACT

An optical receptacle for an optical subassembly is disclosed. The receptacle includes a sleeve made of brittle insulating material, for instance, a ceramics to electrically isolate the housing of the receptacle from the package for a semiconductor device. The receptacle disclosed has an arrangement that prevents the sleeve, even made of brittle material, from cracking. A portion of the sleeve is press-fitted into the housing, while, the metal stopper is press-fitted into another portion of the sleeve, which is apart from the former portion. Accordingly, the sleeve may be escaped from receiving the pressure from both the inside and the outside at the same time, which prevents the sleeve from cracking.

16 Claims, 4 Drawing Sheets

OPTICAL RECEPTACLE

BACKGROUND OF THE INVENTION

1. Field of the Invention

The present invention relates to an optical receptacle that optically couples a semiconductor optical device installed in an optical transmitting module, an optical receiving module and an optical communication module with an optical ferrule secured in a tip of an optical fiber.

2. Related Prior Art

There are two types in the optical module, independent of the optical transmitting module that installs a light-emitting device and the optical receiving module that installs a light-receiving device, depending on the optical coupling with the optical fiber. That is, one type is that the optical fiber permanently couples with the semiconductor device and the other is that the fiber releasably couples with the semiconductor device through an optical receptacle including a sleeve. The latter type is often called as a receptacle type module, which includes a package that installs a semiconductor optical device, a lens holder, a sleeve that mates with an optical ferrule attached in a tip of the optical fiber, and a housing.

Conventional receptacle is generally made of metal and has a cylindrical shape. As the transmission speed of the optical communication grows higher, recently the speed reaches and exceeds 1 GHz, various subjects have been raised. For the optical transmission module, the driving signal for the laser diode becomes a source of the EMI noise to influence the peripheral electric apparatus and devices. The metal receptacle, in particular, a top portion of the receptacle functions as an antenna to radiate the driving signal as the EMI noise. For the receiving module, the top of the metal receptacle receives the noise radiation from the peripheral, which degrades the quality of the electrical signal converted from the faint receiving optical signal.

Accordingly, it is requested to electrically isolate the top of the receptacle from the metal package that installs the semiconductor device or from the circuit connected to the semiconductor device.

Japanese Patent Application published as JP-2005-070499A has disclosed an optical receptacle that uses an insulating material to enhance the noise reduction performance. FIG. 1 is a schematic drawing of the receptacle shown in this prior document. The rigid sleeve 42, made of ceramics, is press-fitted into the metal holder 43, while, the sleeve 42 receives in a rear portion thereof the metal stopper 45 by press-fitting. Behind the holder 43 is welded with the package of the optical device of the transmitting module or the receiving module.

The sleeve 42 also provides a flange 44 in the outer surface thereof. That is, the sleeve 42 is press-fitted into the flange 44. The holder 43 and the flange, both made of metal, are separated to each other. The sleeve 42 releasably receives the ferrule 47 in the aperture of the front end thereof.

Inserting the ferrule 47 that secures the optical fiber 46 in a center thereof into the sleeve 42, the tip of the ferrule 47 abuts against the stopper 45. Practically, the ferrule generally provides a metal shell that secures the ferrule 47, and this metal shell comes in contact with the flange 44 at the same time of abutting ferrule 47 against the stopper 45. In such configuration, because the sleeve is made of insulating material and the metal holder 43 is physically separated from the metal flange 44, the ferrule 47 may be electrically isolated from the package of the optical module.

However, the arrangement of the receptacle shown in the prior document, the metal stopper 45 is press-fitted into the ceramic sleeve 42 and this ceramic sleeve 42 is press-fitted into the holder 43 at the same portion of the sleeve 42. That is, the sleeve 42 is puts between the metal holder 43 and the metal stopper 45 at the same portion thereof. Further, the metal flange 44 positions in the immediate of the metal holder 43.

It is quite hard to press-fit a member into the second member and to press-fit the second member into the third member at the same portion because the inside member is shrunk as well as the outside member is expanded by the press-fitting. Accordingly, since the second member put between the first and third members is shrunk by the first press-fitting, the second press-fitting of the third member into the second member is necessary to be carried out for the shrunk second member. In the practical receptacle, the second member corresponds to the ceramic sleeve. Therefore, it is often encountered that the ceramic sleeve, made of brittle material, is cracked at the first or second press-fitting without precise control of the physical dimensions of the sleeve itself and the metal stopper 45.

SUMMARY OF THE INVENTION

An optical receptacle according to the present invention, which includes a sleeve, a metal stopper and a metal housing, has a feature that the sleeve provides first and second portion along the optical axis of the receptacle, the first portion being press-fitted into the metal housing, while, the metal stopper being press-fitted into the second portion of the sleeve, and these first and second portions of the sleeve is separated to each other. That is, the first portion where the sleeve is press-fitted into the metal housing and the second portion where the metal stopper is press-fitted into the sleeve are not axially overlapped.

According to the configuration of three members described above, the sleeve made of brittle material may be escaped from cracking because the portion press-fitted into the outer member, the metal housing, and another portion to receive the inner member, the metal stopper, by the press-fitting are not axially overlapped, apart along the optical axis of the sleeve. Thus, the press-fitting of the metal stopper into the sleeve does not depends on the press-fitting of the sleeve into the metal housing, which enables for the sleeve to escape from the inducing the crack.

DESCRIPTION OF PREFERRED EMBODIMENTS

Figure 2:
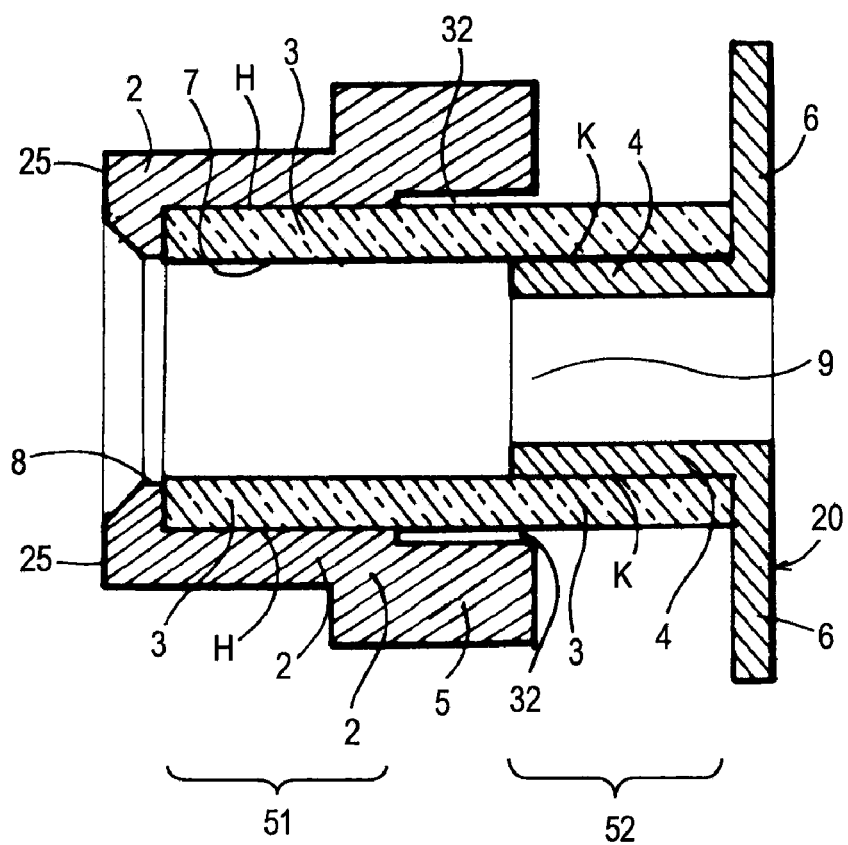
FIG. 2 schematically shows a cross section of a fundamental configuration of an optical receptacle according to the present invention.

FIG. 2 is a cross section schematically showing an optical receptacle according to an embodiment of the present invention. A bore of the metal housing 2 receives a first portion 51 of a sleeve 3 by press-fitting. The sleeve 3 of the present embodiment is made of insulating material. Generally, the receptacle is made of metal, but the embodiment shown in FIG. 2 replaces a metal sleeve of the conventional receptacle with an insulating sleeve 3 and the other portion surrounding the insulating sleeve 3 constitutes the metal housing 2.

A second portion 52 of the sleeve 3 receives a cylindrical stopper 4 by press-fitting. The stopper 4 provides a flange 6 that abuts against an end of the sleeve 3. The housing 2 also provides a flange 5.

A bore 7 of the sleeve 3 releasably receives the ferrule that secures a tip of the optical fiber. When the module providing the optical receptacle shown in FIG. 2 is an optical transmitting module, the flange 6 of the stopper 4 in a rear surface 20 thereof welds a package, which is not shown in figures, that installs a semiconductor laser diode. Light emitted from the laser diode passes through the bore 9 of the stopper 5 to concentrate on the tip of the optical fiber secured with the ferrule in the sleeve 3. On the other hand, the optical receiving module provides a package, which is also not shown in figures, which installs a photodiode and is welded with the rear surface 20 of the flange 6. The light propagated within the optical fiber and emitted from the tip thereof passed through the bore 9 to enter the photodiode in the package.

Figure 1:
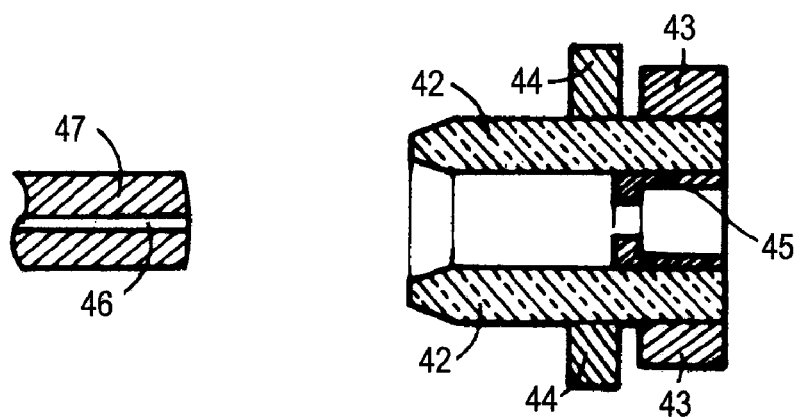
FIG. 1 is a cross section of a conventional optical receptacle.

The stopper 4 shown in FIG. 2 shows a function of both the conventional stopper 45 and the conventional holder 43 each shown in FIG. 1. The bore of the flange portion 5 of the housing 2 is slightly enlarged to form a gap 32 to the outer surfaces of the sleeve 3.

The present embodiment separates an inner surface H of the housing 2 where the sleeve 3 is press-fitted into the housing 2 from an inner surface K of the sleeve 3 where the stopper 4 is press-fitted into the sleeve 3 along an axis of the sleeve 3, which is equivalent to the optical axis of the receptacle. Moreover, the surface H and the surface K does not axially overlap to each other. This arrangement of two surfaces, H and K, may escape the insulating sleeve 3 from cracking. A first portion 51 of the sleeve 3 is press-fitted into the bore H of the housing 2, while, the stopper 4 is press-fitted into the bore K of the sleeve. Accordingly, the insulating sleeve 3, even made of brittle material, may be escaped from cracking because two press-fitting portions, H and K, are separated along the axis of the sleeve, and not axially overlapped.

Moreover, because the sleeve 3 is made of insulating material, the package of the optical device and the metal housing 2 of the receptacle may be electrically isolated to each other.

Figure 3:
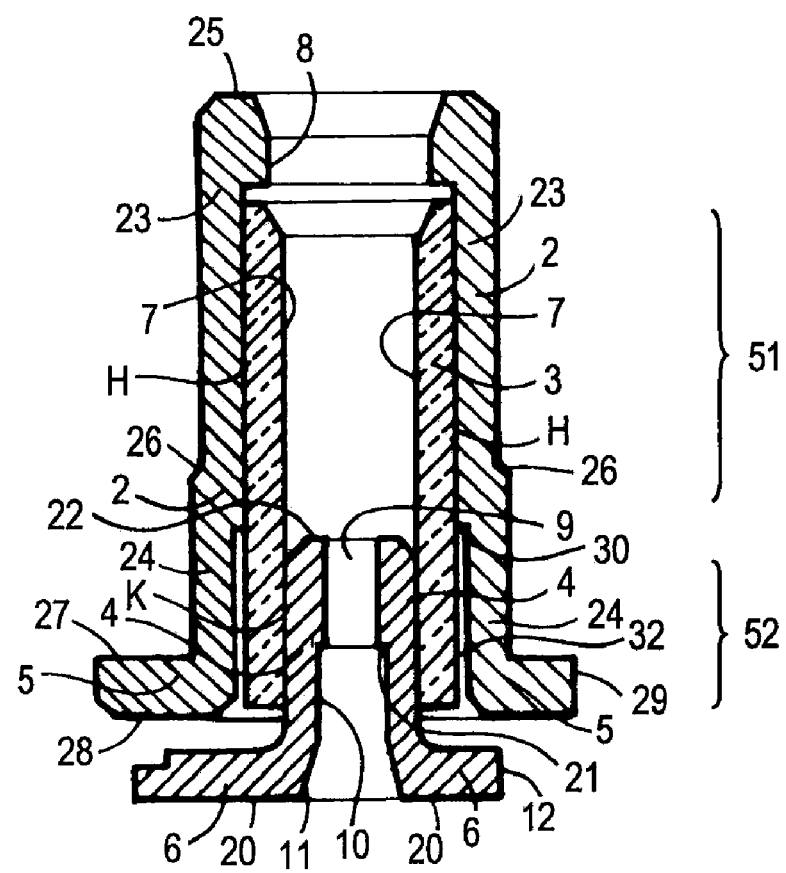
FIG. 3 is a cross section of an embodiment of an optical receptacle of the invention.
Figure 4:
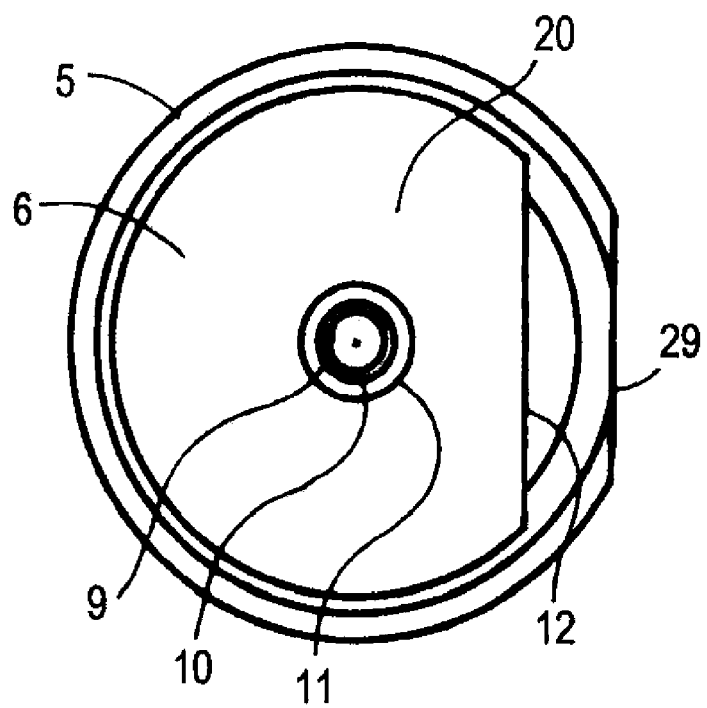
FIG. 4 shows the optical receptacle viewed from a bottom side where the package of the optical device is attached thereto.

FIG. 3 is a cross section of an optical receptacle practically comprised of a cylindrical metal housing 2, an insulating cylindrical sleeve 3 press-fitted into the housing 2, and a cylindrical metal stopper 4 press-fitted into the bore 7 of the sleeve 3. FIG. 4 is a bottom view of the optical receptacle. The receptacle shown in FIGS. 3 and 4 almost follows the fundamental arrangement illustrated in FIG. 2, but has different details.

The metal housing 2 is made of, for instance, stainless steel. The front end 25 of the housing 2 has a flat surface substantially perpendicular to the cylinder axis of the receptacle. The front end of the housing 2 provides a wide aperture into which the ferrule is inserted. The housing 2 provides a front cylinder 23 and a rear cylinder 24 each having a bore with different diameters, that is, the rear cylinder has larger inner and outer diameters than those of the front cylinder. The sleeve 3 in the front portion 51 thereof is press-fitted into the bore of the housing 2. The sleeve 3 is made of ceramics such as zirconia ($ZrO_2$) and alumina ($Al_2O_3$). A sleeve 3 made of resin or plastics is limited in applications because of its less hardness. The sleeve 3 in the inner surface 7 thereof releasably secures the ferrule.

The stopper 4 may determine a position of the front end of the ferrule by abutting against the ferrule. The stopper 4 also has a cylindrical shape with a flange 12 in the rear end thereof and is made of metal. The cylindrical portion, the front portion thereof, is press-fitted into the second portion 52 of the sleeve 3 from the rear aperture of the sleeve 3. The gap 32 between the outer surface of the sleeve 3 in the rear portion thereof and the flange portion 24 of the housing 2 allows the sleeve 3 to deform outward, which facilitates the press-fitting of the stopper 4 into the sleeve 3.

The inner surface H of the housing 2 where the sleeve 3 is press-fitted therein is apart along the cylinder axis from the inner surface K of the sleeve 3 where the stopper 4 is press-fitted therein. Accordingly, any portions of the sleeve 3 do not receive stress from both the inside and the outside in the same time, which prevents the sleeve 3 from cracking at the press-fitting of the sleeve 3 and the stopper 4.

The rear surface 20 of the stopper 4 welds with the front end of the package of the laser diode module or that of the photodiode module.

A depth of the bore of the stopper 4 from the rear surface 20 of the flange 6 to the step 21 was 1.4 mm, while a depth of the smaller bore of the stopper 4 from the step 21 to the other end 22 was 1.1 mm. Accordingly, total depth of the bore, in other words, the total length of the stopper 4 was 2.5 mm.

The diameter of the smaller bore 9 of the stopper was 0.5 mm, that of the intermediate bore 10 was 0.65 mm, and that of the aperture at the rear end 11 was 0.95 mm. The bore 9 may receives a stub made of ceramics that secures an optical fiber in a center thereof. The tip end of the stub inclined to the optical axis of the fiber by about 5° to 10° may prevent the light reflected to an incident direction, which suppresses an instable operation of the laser diode.

The bore 9 may provide a lens. Such arrangement realizes a collimated optical system combined with the laser diode module or the photodiode module each providing a concentrating lens to installs an optical filter or an optical isolator to realize a functional module. The outer diameter of the flange 6 was 4.75 mm. An arched portion of the flange 6 is cut as shown in FIG. 4. A distance from the flat section 12 to the center of the flange was 1.4 mm.

The sleeve 3 is made of zirconia ($ZrO_2$), which appears excellent electrical isolation, mechanical hardness and smoothness in the insertion or the extraction. The bore 7 of the sleeve had a diameter of 1.25 mm.

The aperture 8 at the front end, the outer diameter of the front portion 23, and the outer diameter of the flange portion 24 of the housing 2 were 1.5 mm, 2.8 mm and 3.0 mm, respectively. The flange 5 of the housing 2 had a diameter of 4.75 mm.

A length from the front end 25 to a step 26 in the outer surface of the housing 2, that from the step 26 to the front surface 27 of the flange, and a thickness of the flange 28 were 3.38 mm, 1.77 mm and 0.55 mm, respectively.

The flange 5 of the housing 2 also provides a flat section 29 with a distance from the center of the flange 29 of 2.1 mm.

Thus, a total distance of the housing 2 from the front end 25 to the rear surface 28 of the flange 29 becomes 5.695 mm.

A total length of the assembled housing 2, the sleeve 3 and the stopper 4 from the front end 25 to the rear surface 20 of the flange 6 becomes 6.445 mm. Thus, a overlapping length of the stopper 4 with the housing 2 was 0.75 mm.

The inner bore H of the sleeve 3 comes in contact with the bore of the housing 2, in which the sleeve 3 receives a shrinkage stress directing inward. The housing 2 in the rear portion thereof behind the step 30 expands the bore to secure the gap 32 to the sleeve 3. This gap mechanically isolates the sleeve 3 from the housing 2.

The stopper 4 comes in contact with the sleeve 3 at the surface K in the rear portion thereof. The sleeve 3 receivers an expanding force at the surface K directing outward. Because of the length of the stopper 4, the front portion of the sleeve 3 does not come in contact with the stopper 4.

As described, because the surface H where the sleeve receives the shrinking force directing inward is apart from the surface H where the sleeve receives the expanding force directing outward, that is, the stopper 4 is press-fitted into the bore K of the sleeve 3, while, the sleeve 3 is press-fitter into the bore H of the housing 2.

The invention claimed is:

1. An optical receptacle for releasably receiving a ferrule attached to a tip of an optical fiber, the optical receptacle providing an optical axis, comprising:
    a sleeve made of cylindrical ceramics and including a first portion on one side of the sleeve and a second portion on another side of the sleeve, wherein the second portion is separated from the first portion in a direction parallel to the optical axis, the sleeve receiving the ferrule in the first portion from one end of the sleeve;
    a metal stopper with a bore and press-fitted into the second portion of the sleeve from another end of the sleeve; and
    a metal housing to receive the first portion of the sleeve by press-fining, the metal housing being physically separated from the metal stopper.

2. The optical receptacle according to claim 1, wherein the metal stopper includes a stub made of ceramics in the bore, the stub securing a coupling fiber in a center thereof.

3. The optical receptacle according to claim 1, wherein the metal stopper includes a lens in the bore.

4. The optical receptacle according to claim 1, wherein the sleeve is made of one of zirconia ($ZrO_2$) and alumina ($Al_2O_3$).

5. The optical receptacle according to claim 1, wherein the metal housing includes a first portion and a second portion, the first portion receiving the sleeve by press-fitting, the second portion having an inner diameter greater than an inner diameter of the first portion of the housing such that a gap is formed between an outer surface of the sleeve and an inner surface of the second portion of the housing.

6. An optical receptacle for releasably receiving a ferrule attached to a tip of an optical fiber, the optical receptacle including an optical axis, comprising:
    a cylindrical metal housing with a bore;
    a cylindrical ceramic sleeve press-fitted into the bore of the metal housing, the sleeve having a bore for receiving the ferrule on one end side thereof; and
    a cylindrical metal stopper press-fined into the bore of the sleeve on the other end side of the sleeve,
    wherein a region of the sleeve press-fitted into the metal housing is separated in a direction parallel to the optical axis from another region where the metal stopper is press-fitted.

7. The optical receptacle according to claim 6, wherein the metal stopper includes a stub made of ceramics in the bore, the stub securing a coupling fiber in a center thereof.

8. The optical receptacle according to claim 6, wherein the sleeve is made of one of zirconia ($ZrO_2$) and alumina ($Al_2O_3$).

9. The optical receptacle according to claim 6, wherein the metal housing includes a first portion and a second portion, the first portion receiving the sleeve by press-fitting, the second portion having an inner diameter greater than an inner diameter of the first portion of the housing such that a gap is formed between an outer surface of the sleeve and an inner surface of the second portion of the housing.

10. An optical module releasably receiving a ferrule attached to a tip of an optical fiber, the optical module including an optical axis, comprising:
    an optical receptacle including:
        a cylindrical metal housing with a bore,
        a cylindrical ceramic sleeve providing a first region and a second region separated in a direction parallel to the optical axis from the first region, the first region of the sleeve being press-fitted into the bore of the metal housing, the sleeve having a bore for receiving the ferrule on one end side thereof, and
        a cylindrical metal stopper press-fitted into the second region of the bore of the sleeve on the other end side of the sleeve; and
    an optical device including:
        a metal package; and
        a semiconductor optical device installed within the metal package and optically coupled with the optical fiber through the optical receptacle,
    wherein the metal package is welded with the metal stopper of the optical receptacle.

11. The optical module according to claim 10, wherein the metal stopper includes a flange to which the metal package of the optical device is welded.

12. The optical module according to claim 10, wherein the metal stopper includes a stub made of ceramics in the bore, the stub securing a coupling fiber in a center thereof.

13. The optical module according to claim 10, wherein the sleeve is made of one of zirconia ($ZrO_2$) and alumina ($Al_2O_3$).

14. The optical module according to claim 10, wherein the metal housing includes a first portion and a second portion, the first portion receiving the sleeve by press-fitting, the second portion having an inner diameter greater than an inner diameter of the first portion of the housing such that a gap is formed between an outer surface of the sleeve and an inner surface of the second portion of the housing.

15. The optical module according to claim 10, wherein the semiconductor optical device is a semiconductor laser diode.

16. The optical module according to claim 10, wherein the semiconductor optical device is a semiconductor photodiode.

* * * * *